United States Patent
Kraft

(10) Patent No.: US 8,059,432 B2
(45) Date of Patent: Nov. 15, 2011

(54) PWM CONTROLLER HAVING DRIVE CONTROL WITH INPUT VOLTAGE SENSING AND METHOD THEREFOR

(75) Inventor: Jonathan P. Kraft, Frederick, CO (US)

(73) Assignee: Semiconductor Components Industries, LLC., Phoenix, AZ (US)

( * ) Notice: Subject to any disclaimer, the term of this patent is extended or adjusted under 35 U.S.C. 154(b) by 655 days.

(21) Appl. No.: 11/954,506

(22) Filed: Dec. 12, 2007

(65) Prior Publication Data
US 2009/0153123 A1    Jun. 18, 2009

(51) Int. Cl.
*H02H 7/12* (2006.01)
(52) U.S. Cl. .......... 363/56.11; 361/92; 323/299
(58) Field of Classification Search .......... 323/299, 323/301; 363/56.09, 56.11, 50; 361/92, 361/89
See application file for complete search history.

(56) References Cited

U.S. PATENT DOCUMENTS

| | | | |
|---|---|---|---|
| 4,709,320 A * | 11/1987 | Konopka | 363/56.01 |
| 4,791,544 A * | 12/1988 | Gautherin et al. | 363/49 |
| 5,907,224 A * | 5/1999 | Yamashita et al. | 315/308 |
| 6,597,221 B2 | 7/2003 | Hall et al. | |
| 6,744,645 B2 * | 6/2004 | Balakrishnan et al. | 363/50 |
| 6,914,793 B2 | 7/2005 | Balakrishnan et al. | |
| 2007/0007937 A1 * | 1/2007 | Park et al. | 323/284 |

OTHER PUBLICATIONS

Data Sheet, "NCP1231 Low-Standby Power High Performance PWM Controller", Copyright Jun. 2004—Rev. 1, Semiconductor Components Industries, LLC., 20 pages.
Data Sheet, FAN7602B Green Current-Mode PWM Controller, Mar. 2007, Copyright 2007 Fairchild Semiconductor Corporation, FAN7602B Rev. 1.0.0, 17 pages.

* cited by examiner

*Primary Examiner* — Harry Behm
(74) *Attorney, Agent, or Firm* — Robert F. Hightower

(57) ABSTRACT

In one embodiment, a PWM controller includes a circuit operably coupled to inhibit a drive signal responsively to a bulk input voltage remaining at a low value for a time interval and to re-enable the drive signal subsequently to the time interval responsively to the bulk input voltage increasing to greater than the first value subsequently to the time interval. In another embodiment, a method of forming a PWM controller includes configuring the PWM controller to use a clock signal to form a drive signal and to sense a bulk input voltage decreasing to no greater than a first value and to disable the drive signal without disabling the clock signal responsively to the bulk input voltage remaining no greater than the first value for a time interval.

14 Claims, 5 Drawing Sheets

US 8,059,432 B2

PWM CONTROLLER HAVING DRIVE CONTROL WITH INPUT VOLTAGE SENSING AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to produce pulse width modulated (PWM) power supply controllers. In some cases, the power supply controllers monitored the average value of a bulk input voltage to determine if the bulk input voltage was sufficient to form a desired output voltage. These types of controllers also relied on a ripple voltage on the bulk input voltage in order to provide the protection. In most cases, the monitors and sensors did not have sufficient accuracy. As a result, the bulk input voltage value at which the PWM controller went into a protection mode varied. The inaccurate detection often resulted in damage to the power supply controller.

Accordingly, it is desirable to have a PWM controller that more accurately senses the bulk input voltage, and that protects the power supply controller.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to about ten per cent (10%) (and up to twenty per cent (20%) for semiconductor doping concentrations) are regarded as reasonable variances from the ideal goal of exactly as described.

DETAILED DESCRIPTION OF THE DRAWINGS

Figure 1:
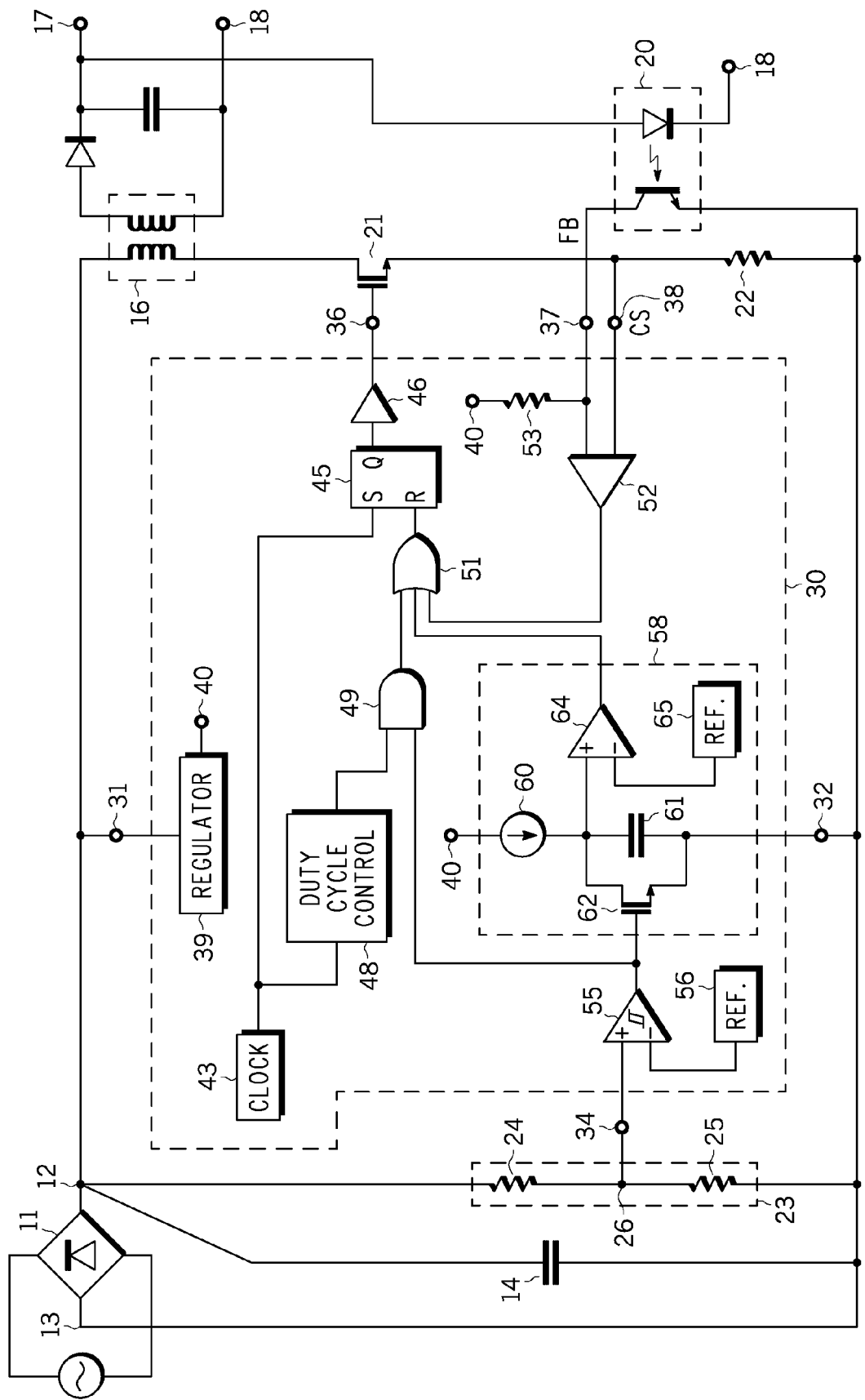
FIG. 1 illustrates an embodiment of a power supply system that schematically illustrates a portion of an exemplary embodiment of a pulse width modulated (PWM) power supply controller in accordance with the present invention.

FIG. 1 schematically illustrates a portion of an embodiment of a power supply system 10 that illustrates a portion of an exemplary embodiment of a pulse width modulated (PWM) power supply controller or PWM controller 30. System 10 receives input power between a power input terminal 12 and a power return terminal 13, and forms an output voltage between an output terminal 17 and an output return 18. A load (not shown) generally is connected between terminal 17 and return 18. Terminals 12 and 13 generally are coupled to receive a bulk input voltage that is formed between terminals 12 and 13 by a bridge rectifier 11. A filter capacitor 14 assists in forming the bulk input voltage. Controller 30 forms a drive signal that is used to control the operation of a power switch, such as a power transistor 21, and regulate the value of the output voltage between terminal 17 and return 18 to a desired value. Transistor 21 typically is connected to a transformer 16 in order to control current flow through transformer 16 in order to regulate the output voltage. A feedback network 20 is connected to receive the output voltage and form a feedback (FB) signal that is representative of the value of the output voltage. A current sense circuit, such as a resistor 22, usually is coupled to form a current sense (CS) signal that is representative of the value of the current flowing through transistor 21. A sensing network 23 is connected between terminals 12 and 13 in order to receive the bulk input voltage and form a line sense signal at a node 26 that is representative of the value of the bulk input voltage. Sensing network 23 typically includes resistors 24 and 25 that are connected in series between terminals 12 and 13.

As will be seen further hereinafter, controller 30 is configured to sense the value of the bulk input voltage between terminals 12 and 13 decreasing to a value that is no greater than a first value and to disable the drive signal that is used to drive transistor 21 responsively to the bulk input voltage remaining no greater than this first value for a first period of time or a first time interval. Controller 30 is connected to receive input power between a voltage input 31 and a voltage return 32. Input 31 and return 32 typically are connected to respective terminals 12 and 13. Controller 30 generally includes a drive output 36, a feedback (FB) input 37, a current sense (CS) input 38, and a sense input 34 that is connected to receive the line sense signal from network 23. FB input 37 is connected to receive the FB signal from feedback network 20 and CS input 38 is connected to receive the CS signal that is representative of the current through transistor 21. Drive output 36 provides a switching drive signal or drive signal that is utilized to operate transistor 21 and regulate the output voltage between terminal 17 and return 18 to the desired value.

Controller 30 includes a substantially fixed frequency clock circuit or clock 43, a PWM latch 45, a PWM driver 46, a maximum duty cycle control circuit 48, an optional AND gate 49, an OR gate 51, and a voltage-current mode comparator 52. Controller 30 also generally includes an internal regulator 39 that is coupled between input 31 and return 32 to receive the input voltage and form an internal operating voltage on an output 40 that is used for operating elements of controller 30 such as latch 45 and gates 49 and 51. In some cases, regulator 39 may include a high voltage start-up circuit that forms a low voltage from the high voltage on input 31 and then uses this low voltage to form the operating voltage on output 40. Such start-up circuits and internal regulators are well known to those skilled in the art. Additionally, in some cases, the high voltage start-up circuit may be connected between input 31 and terminal 12 with the output of the high voltage circuit connected to input 31. Clock 43 forms a substantially fixed frequency clock signal that is used to set latch 45 and initiate a cycle of the drive signal on output 36. Setting latch 45 assert the drive signal which enables transistor 21 and forms the CS signal on input 38 as current begins to flow through transistor 21. Comparator 52 receives the CS and FB signals and the output of comparator 52 goes high when the CS signal reaches the value of the FB signal. The high from comparator 52 resets latch 45 and terminates the active portion of the cycle of the drive signal by negating the drive signal. The duty cycle of the drive signal is determined as the active portion of the drive signal divided by the total period of the drive signal. Maximum duty cycle control circuit 48 is used to limit the maximum duty cycle of the drive signal formed on output 36. Circuit 48 receives the clock signal from clock 43 and forms a control signal at a point in the period of the drive signal where it is desired for the active portion of the drive signal to terminate and limit the duty cycle to a maximum value. Such duty cycle control circuits are well known to those skilled in the art. At the selected point in the cycle of the drive signal, the control signal from circuit 48 goes high and resets latch 45 through gates 49 and 51 even if latch 45 is still set and has not been reset by comparator 52.

Controller 30 also includes a line detector, implemented as a hysteresis comparator 55, and a time control circuit 58 that are used to assist in controlling the drive signal. In one embodiment, circuit 58 includes a substantially constant current source 60, a capacitor 61, a transistor 62, a comparator 64, and a reference generator or ref 65. However, those skilled in the art will appreciate that circuit 58 may have other embodiments as long as the functionality of circuit 58 described hereinafter is preserved.

Figure 2:
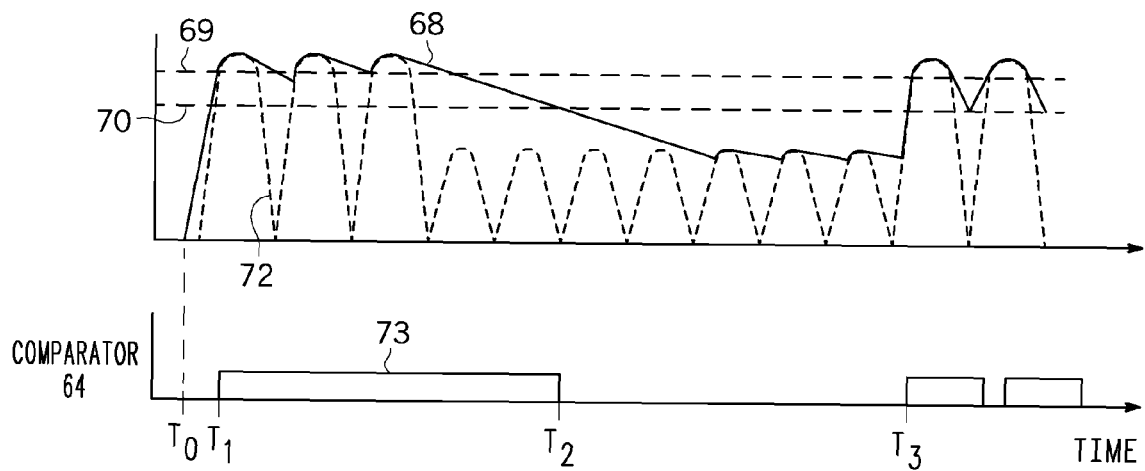
FIG. 2 is a graph having plots that illustrate some of the signals of the system of FIG. 1 in accordance with the present invention.

FIG. 2 is a graph having plots that illustrate some of the signals of system 10. The abscissa indicates time and the ordinate indicates increasing value of the illustrated signal. A plot 68 illustrates the bulk input voltage formed between terminals 12 and 13. A plot 72 illustrates in dashed lines the value of the bulk voltage if capacitor 14 were not present. A plot 69 illustrates as a dashed line a first value of the bulk input voltage and a plot 70 illustrates as a dashed line a second value of the bulk input voltage. A plot 73 illustrates the output of comparator 64. This description has references to both FIG. 1 and FIG. 2. Although the bulk input voltage is a substantially DC voltage, there often is some ripple voltage that occurs at substantially the frequency of the AC input voltage. Plot 68 illustrates this ripple voltage that is formed on top of the average DC value of the bulk input voltage. The valley or lower value of this ripple varies depending on the amount of current required by the load (not shown) that is connected between terminal 17 and return 18. As the load current increases, the valley value decreases and as the load current decreases the valley value increases. During one cycle of plot 68, controller 30 forms numerous drive signals to operate transistor 21 and regulate the value of the output voltage because the frequency of clock 43 is much greater than the frequency of the ripple voltage. As long as the ripple voltage increases after reaching the valley value, system 10 generally receives sufficient power to sustain the operation of the load. However, if the value of the input voltage decreases and causes the valley value to decrease below a minimum value and remains below the minimum value, as illustrated between times T2 and T3, system 10 may not receive sufficient power to operate the load. Controller 30 is configured to detect the instantaneous value of the bulk input voltage decreasing below a first value, such as a value illustrated by plot 70, remaining below that value for an extended period of time, and responsively terminating the drive signal. If the instantaneous value of the bulk input voltage increases past the first value and reaches a second value before the time interval expires, such as the value illustrated by plot 69, controller 30 is configured to reset the time interval and not terminate the drive signal. Controller 30 optionally is configured to increase the duty cycle of the drive signal during the time interval in order to apply more power to the load while waiting to see if the instantaneous value of the bulk input voltage will increase back above the second value.

Comparator 55 receives the line sense signal from input 34. If the instantaneous value of the bulk voltage is sufficient for the line sense signal to be greater than the value of the voltage from ref 56, the output of comparator 55 is high which has no effect through gates 49 and 51 on the drive signal. The high from comparator 55 also enables transistor 62 which prevents starting the time interval. If the instantaneous value of the bulk input voltage decreases below a first value that is sufficient to cause the line sense signal to decrease less than the value of ref 56, the output of comparator 55 goes high. The high from comparator 55 disables transistor 62 and allows capacitor 61 to charge at a rate determined by the value of current source 60 and the value of capacitor 61. Capacitor 61 charges for the time interval until reaching a value that is greater than the value of the voltage from ref 65 which forces the output of comparator 64 high. During the time interval while capacitor 61 is charging, controller 30 continues operating and forming drive signals to operate transistor 21 and regulate the value of the output voltage. Typically, the time interval is sufficient to ensure that the instantaneous value of the ripple voltage will increase again to bring the instantaneous value of the bulk voltage back above the first value to the second value. If the instantaneous value increases back to the second value before the time interval expires, it is assumed that the decrease was a transient and that the drive signal should not be inhibited. For example, the time interval may be as low as ten (10) milli-seconds and generally is at least greater than a period of ripple voltage (one-half of the frequency of the AC input voltage). The high from comparator 64 forces the output of gate 51 high and resets latch 45 thereby terminating the current drive signal and preventing controller 30 from forming subsequent drive signals until the instantaneous value of the bulk input voltage increases past the second value that causes the sense signal to increase to a value greater than the value of the signal from ref 56 plus the hysteresis of comparator 55. If during the time interval the instantaneous value of the bulk input voltage increases to the second value, the output of comparator 55 again goes high which immediately discharges capacitor 61 and terminates the time interval thereby preventing circuit 58 from inhibiting the drive signal. Using circuit 58 facilitates using a fixed value for the hysteresis of comparator 55. Without circuit 58, the hysteresis would have to be adjusted by an external element. This adjustment element would require an additional pin of the package in which controller 30 is formed thereby adding to the cost of controller 30. Also, external adjustment elements generally result in lower accuracy. Supplying more power to the load responsively to the bulk input voltage decreasing eliminates the need for large filter capacitors thereby allowing the use of low capacitance values for capacitor 14 which decreases system costs. Those skilled in the art will appreciate that the instantaneous value of the bulk input voltage may also decrease if the current required by the load (not shown) increases to a value that is greater than the current supplied by system 10 and that controller 30 operates as describe for a decrease resulting from the input voltage decreasing.

In an optional configuration, the output of comparator 55 is also used to inhibit circuit 48 from limiting the maximum duty cycle of the drive signal. Generally, if the bulk input voltage decreases, system 10 has to supply more power to the load in order to maintain the output voltage at the desired output voltage value. Configuring controller 30 to increase the duty cycle by not limiting the maximum duty cycle of the drive signal during the time that the bulk input voltage is low, supplies more power to the load thereby assisting in maintaining the desired value of the output voltage even though the bulk input voltage has decreased. In this optional configuration, when the bulk input voltage decreases and causes the output of comparator 55 to go low, the low from comparator 55 forces the output of optional AND gate 49 low which prevents circuit 48 from resetting latch 45. Thus, the low from comparator 55 allows controller 30 to increase the duty cycle of the drive signal without affecting the off-time of the drive signal. Note that the off-time is controlled by comparator 52 (within the cycle formed by clock 43), thus, the off-time is a variable value and is not a fixed value. At the time that the bulk input voltage increases so that the output of comparator 55 goes high, controller 30 allows circuit 48 to again limit the maximum duty cycle of the drive signal.

In order to facilitate this functionality for controller 30, an output of clock 43 is connected to a set input of latch 45 and to an input of circuit 48. An output of circuit 48 is connected to a first input of gate 49. The output of gate 49 is connected to a first input of gate 51 which has an output connected to a reset input of latch 45. A Q output of latch 45 is connected to an input of driver 46 which has an output connected to output 36. A non-inverting input of comparator 55 is connected to input 34 and an inverting input is connected to the output of ref 56. The output of comparator 55 is commonly connected to a second input of gate 49 and to a gate of transistor 62. A source of transistor 62 is commonly connected to return 32 and a first terminal of capacitor 61. A drain of transistor 62 is commonly connected to an output of current source 60, a second terminal of capacitor 61, and a non-inverting input of comparator 64. A second terminal of source 60 is connected to output 40 of regulator 39. An inverting input of comparator 64 is connected to an output of ref 65. The output of comparator 64 is connected to a second input of gate 51 which has a third input connected to the output of comparator 52. A non-inverting input of comparator 52 is commonly connected to input 37 and a first terminal of resistor 53 which has a second terminal connected to output 40. An inverting input of comparator 52 is connected to input 38.

Figure 3:
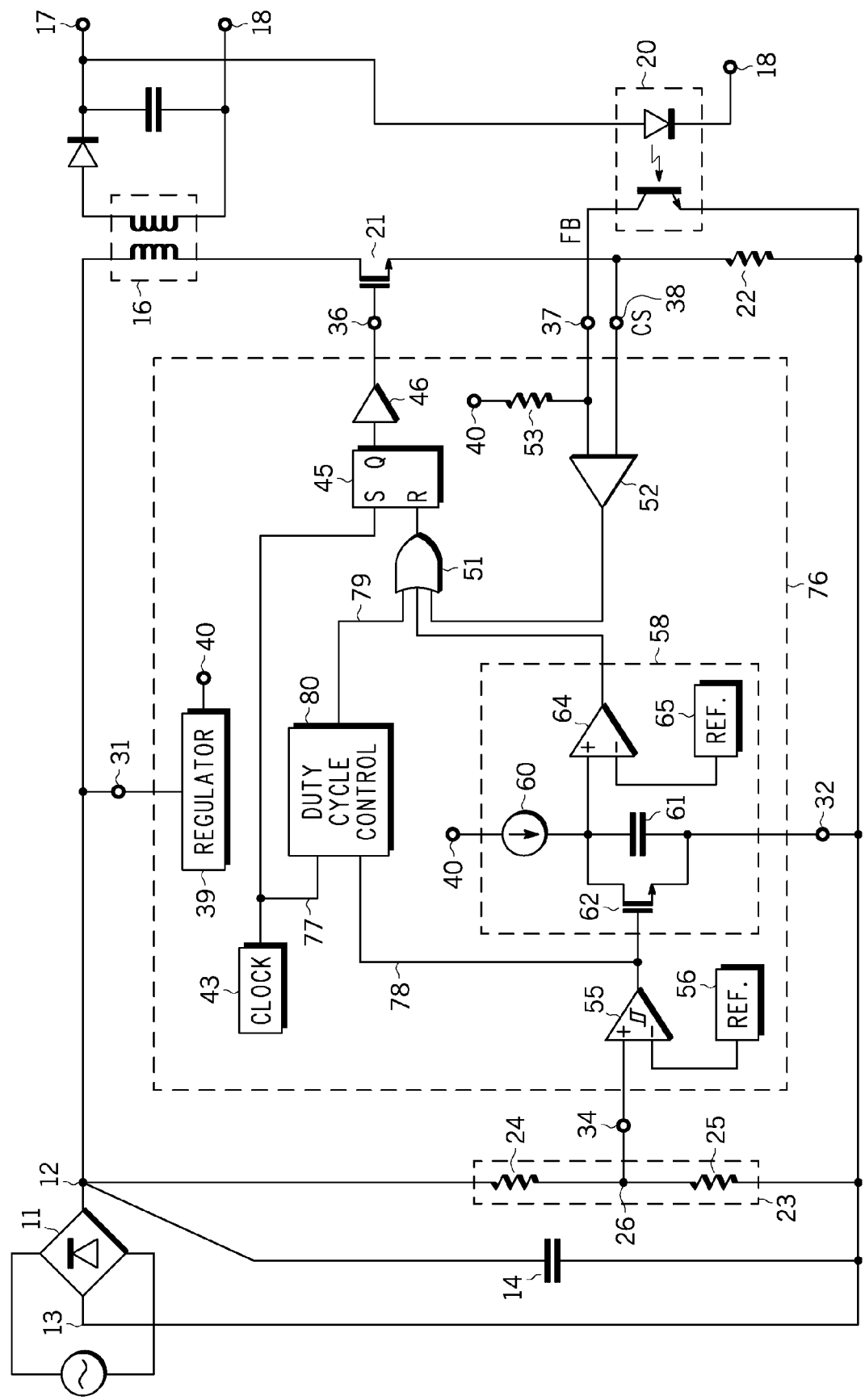
FIG. 3 illustrates an embodiment of a power supply system that schematically illustrates a portion of an exemplary embodiment of another pulse width modulated (PWM) power supply controller that is an alternate embodiment of the PWM power supply controller of FIG. 1 in accordance with the present invention.

FIG. 3 schematically illustrates a portion of an embodiment of a power supply system 75 that illustrates a portion of an exemplary embodiment of a PWM controller 76. System 75 and controller 76 are alternate embodiments of respective system 10 and controller 30 that were described in the description of FIG. 1 and FIG. 2. Controller 76 is similar to controller 30 except that controller 76 includes a maximum duty cycle control circuit 80 that is an alternate embodiment of maximum duty cycle control circuit 48 of controller 30. Maximum duty cycle control circuit 80 is configured to change the maximum duty cycle of the drive signal responsively to the bulk input voltage becoming less than the first value. When the value bulk input voltage is greater than the first value, the output of comparator 55 is high and circuit 80 limits the maximum duty cycle to a first duty cycle value, for example eighty percent (80%). When the value of the bulk input voltage decreases to the first value, the output of comparator 55 is low and circuit 80 limits the maximum duty cycle to a second duty cycle value that is greater than the first duty cycle value, for example ninety five percent (95%). Increasing the duty cycle delivers more power to the load and allows the use of smaller filter capacitors thereby reducing the system costs.

Figure 4:
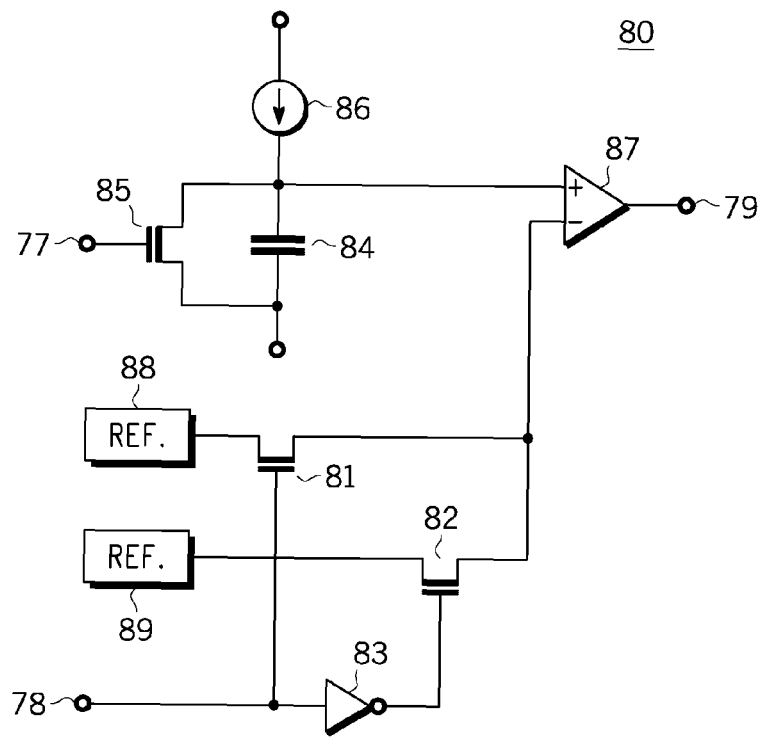
FIG. 4 schematically illustrates a portion of an embodiment of a circuit of the PWM controller of FIG. 3 in accordance with the present invention.

FIG. 4 schematically illustrates one example embodiment of circuit 80. When the clock signal from clock 43 goes high, transistor 85 is enabled to discharge capacitor 84 and force the output of comparator 87 low. When the clock signal goes low, a constant current source 86 charges a capacitor 84 at a substantially constant rate. If the bulk input voltage is greater than the first value, the output of comparator 55 is high, thus, input 78 is high which enables transistor 81 and disables transistor 82. Enabling transistor 81 couples the reference voltage from a reference or ref 88 to comparator 87. When capacitor 84 charges to the value of ref 88, the output of comparator 87 goes high which resets latch 45. If the value of the bulk input voltage is less than the first value, input 78 is low which disables transistor 81 and enables transistor 82 to couple the reference voltage from reference or ref 89 to comparator 87. Ref 89 is formed to have a higher voltage than ref 88, thus, it takes longer to force the output of comparator 87 high thereby allowing the drive signal to remain active for a longer portion of the clock period or drive signal period. Those skilled in the art will appreciate the example embodiment illustrated in FIG. 4 may be replaced by other embodiments that perform a similar function.

Figure 5:
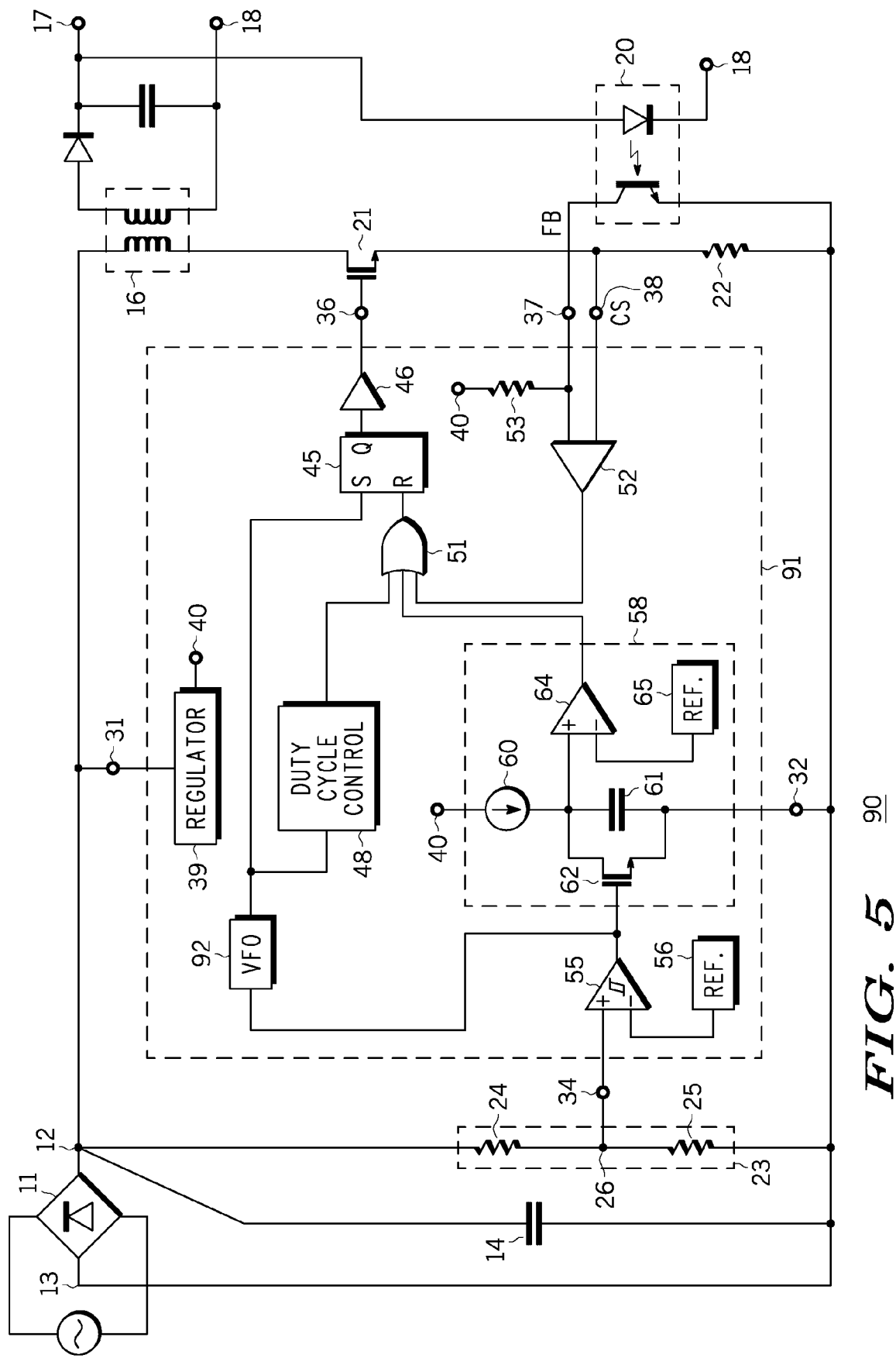
FIG. 5 illustrates an embodiment of a power supply system that illustrates a portion of an exemplary embodiment of yet another pulse width modulated (PWM) power supply controller that is an alternate embodiment of the PWM power supply controller of FIG. 1 in accordance with the present invention.

FIG. 5 schematically illustrates a portion of an embodiment of a power supply system 90 that illustrates a portion of an exemplary embodiment of a PWM controller 91. Controller 91 is similar to controller 30, however, controller 91 has a variable frequency oscillator (VFO) 92 instead of fixed frequency clock 43 that was used by controller 30. Controller 91 is configured to decrease the value of the clock signal formed by oscillator 92 responsively to the bulk input voltage decreasing to no greater than the first value. Decreasing the frequency of oscillator 92 allows the drive signal to remain enabled for a longer period of time thereby increasing the amount of power delivered to the load. Those skilled in the art will appreciate that gate 49 may be utilized by controller 91 in order to inhibit the effect of circuit 48. Additionally, those skilled in the art will appreciate that circuit 48 may be replaced by circuit 80 that was described in the description of FIG. 3.

Figure 6:
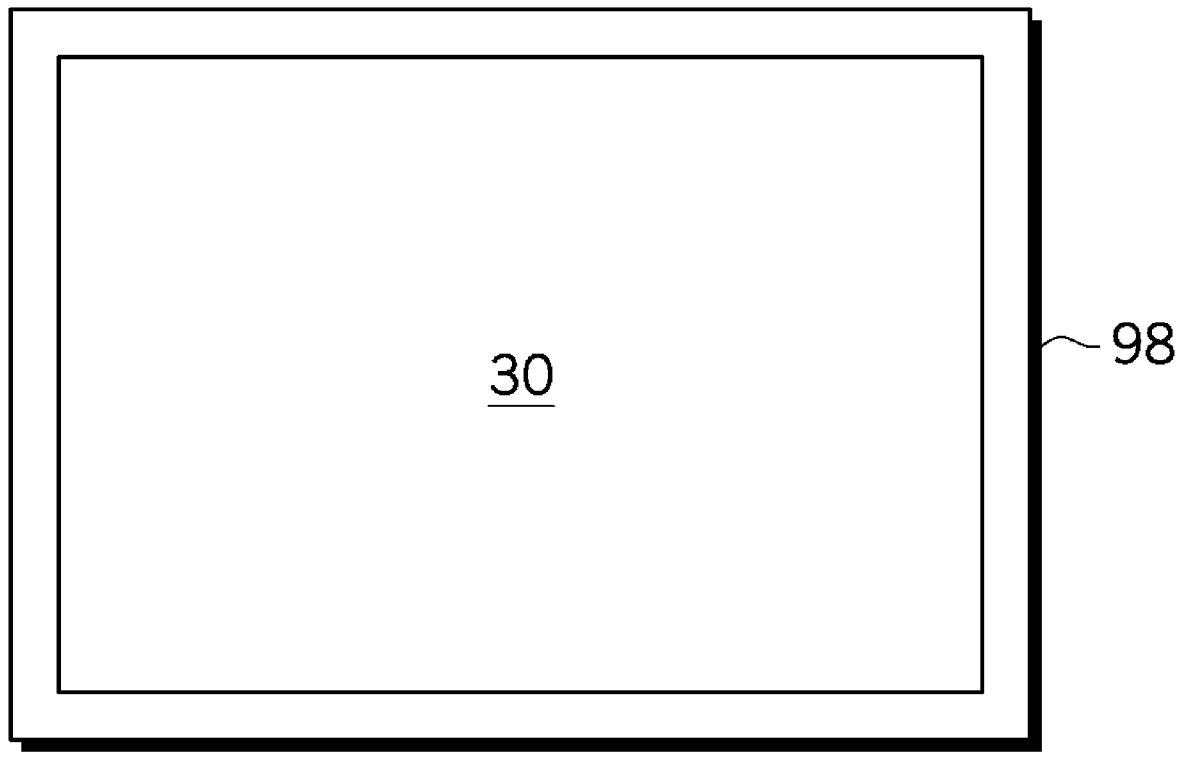
FIG. 6 schematically illustrates an enlarged plan view of a semiconductor device that includes the pulse width modulated (PWM) power supply controller of FIG. 1 in accordance with the present invention.

FIG. 6 schematically illustrates an enlarged plan view of a portion of an embodiment of a semiconductor device or integrated circuit 97 that is formed on a semiconductor die 98. Controller 30 or controllers 76 or 91 are formed on die 98. Die 98 may also include other circuits that are not shown in FIG. 6 for simplicity of the drawing. Controller 30 and device or integrated circuit 97 are formed on die 98 by semiconductor manufacturing techniques that are well known to those skilled in the art.

In view of all of the above, it is evident that a novel device and method is disclosed. Included, among other features, is forming a PWM controller to inhibit the drive signal responsively to the instantaneous value of the bulk input voltage remaining no greater than the first value for a first time interval and to reset the time interval if the instantaneous value of the bulk input voltage increases before the time interval expires. Using the instantaneous value of the bulk voltage allows controller 30 to quickly react to the subsequent increase in the voltage instead of waiting for the average value to increase as is done by some prior implementations. Therefore, using the instantaneous value of the bulk voltage results in a more accurately sensing the condition than some prior implementations that sense the average value. Also, this functionality facilitates using a single input pin of a semiconductor device to set the upper and lower limits of the bulk input voltage thereby reducing the costs.

While the subject matter of the invention is described with specific exemplary and preferred embodiments, it is evident that many alternatives and variations will be apparent to those skilled in the semiconductor arts. For example, circuit 58 is illustrated with a specific embodiment but those skilled in the art will appreciate that other embodiments are possible as long as the embodiment provides the function of circuit 58. Additionally, comparator 55 may be implemented with a different circuit. Although the invention has been described in the context of a current mode controller, those skilled in the art will appreciate that that the invention also is applicable to other control methods including voltage mode control. Further, other well-known methods may be used, instead of resistor 22, to sense the current through transistor 21. Although controller 30 is illustrated to use a fixed frequency clock, other well-known control loop methods may be used including a variable frequency clock and a hysteresis control loop. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A PWM controller comprising:
    a first circuit configured to provide a drive signal used to regulate an output voltage to a desired value;
    a second circuit operably coupled to detect a bulk input voltage decreasing to a first value and responsively form a first control signal; and
    a third circuit operably coupled to receive the first control signal and to disable the drive signal responsively to the bulk input voltage remaining no greater than the first value for a time interval and operably coupled to inhibit disabling the drive signal and to reset the time interval responsively to the bulk input voltage increasing to a second value that is greater than the first value before the time interval expires, the third circuit configured to re-enable the drive signal subsequently to the time interval responsively to the bulk input voltage increasing to the second value subsequently to the time interval.

2. The PWM controller of claim 1 wherein the PWM controller is operably coupled to increase a maximum allowable duty cycle of the drive signal responsively to the first control signal.

3. The PWM controller of claim 2 further including a duty cycle control circuit that forms a duty cycle control signal that is used to limit a maximum allowable duty cycle of the drive signal to a first duty cycle value and further including logic that negates the duty cycle control signal responsively to the first control signal.

4. The PWM controller of claim 2 further including a duty cycle control circuit that forms a maximum duty cycle control signal having a first control value that limits a maximum allowable duty cycle of the drive signal to a first duty cycle value responsively to a first state of the first control signal and limits the maximum allowable duty cycle to a second duty cycle value responsively to a second state of the first control signal.

5. The PWM controller of claim 1 wherein the third circuit includes a timer that is coupled to start the time interval responsively to a first state of the first control signal and to reset the time interval responsively to a second state of the first control signal.

6. The PWM controller of claim 1 wherein the second circuit includes a comparator coupled to compare a signal that is representative of the bulk voltage to a reference signal.

7. The PWM controller of claim 6 wherein the third circuit includes a timer that is coupled to start the time interval responsively to a first state of the comparator and to reset the time interval responsively to a second state of the comparator.

8. A method of forming a PWM controller comprising:
    configuring an oscillator circuit to form a clock signal having a period;
    configuring the PWM controller to use the clock signal to form a drive signal used to regulate an output voltage to a desired value, the drive signal having the period of the clock signal;
    configuring the PWM controller to sense a bulk input voltage decreasing to no greater than a first value and to disable the drive signal without disabling the clock signal responsively to the bulk input voltage remaining no greater than the first value for a time interval wherein the PWM controller continues forming drive signals during the time interval; and
    configuring the PWM controller to not disable the drive signal responsively to the bulk input voltage increasing to greater than the first value at any time prior to the time interval expiring.

9. The method of claim 8 further including configuring the PWM controller to increase a maximum allowable duty cycle of the drive signal from a first duty cycle value to a second duty cycle value responsively to the bulk input voltage decreasing to no greater than the first value.

10. The method of claim 9 further including configuring the PWM controller to decrease the maximum allowable duty cycle to the first value responsively to the bulk input voltage increasing to greater than the first value.

11. The method of claim 8 wherein configuring the PWM controller to sense the bulk input voltage includes configuring the PWM controller to form the time interval to be no less than approximately a period of a ripple voltage of the bulk input voltage.

12. The method of claim 8 wherein configuring the PWM controller to sense the bulk input voltage includes configuring the PWM controller to form the time interval to be no less than approximately ten milli-seconds.

13. The method of claim 8 further including configuring the PWM controller to re-enable the drive signal subsequently to the time interval responsively to the bulk input voltage increasing to a second value that is greater than the first value subsequently to the time interval.

14. The method of claim 8 further including resetting the time interval responsively to the bulk input voltage increasing to greater than the first value at any time prior to the time interval expiring.

* * * * *